C. McVEETY.
HUMIDIFIER FOR FURNACES.
APPLICATION FILED MAR. 28, 1922.
1,438,318.
Patented Dec. 12, 1922.
2 SHEETS—SHEET 1.
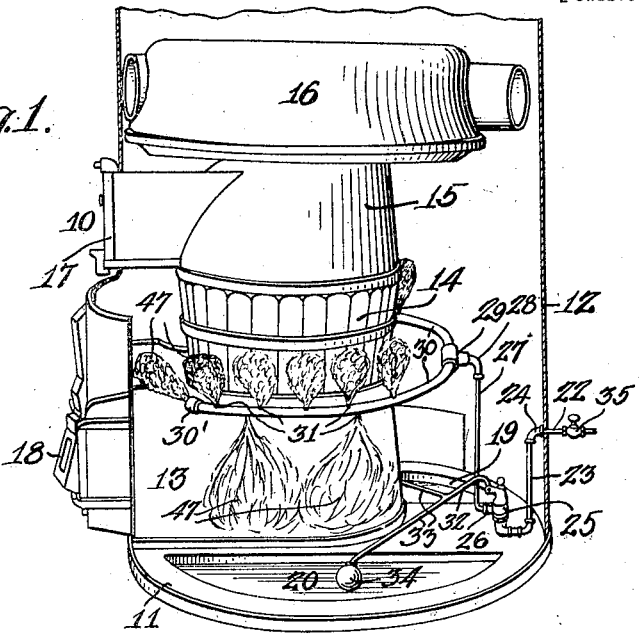
Fig.1.
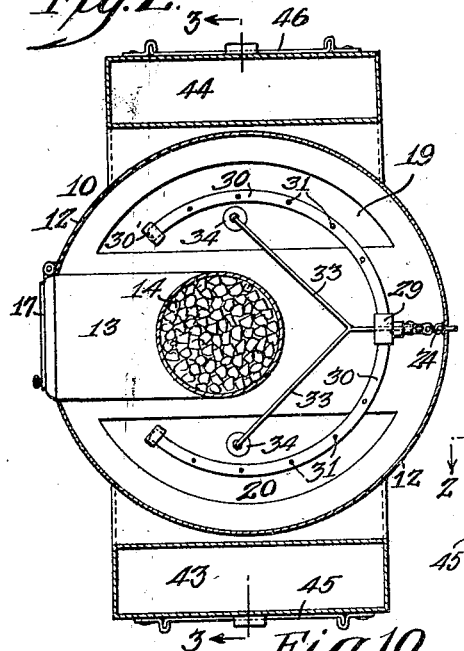
Fig.2.
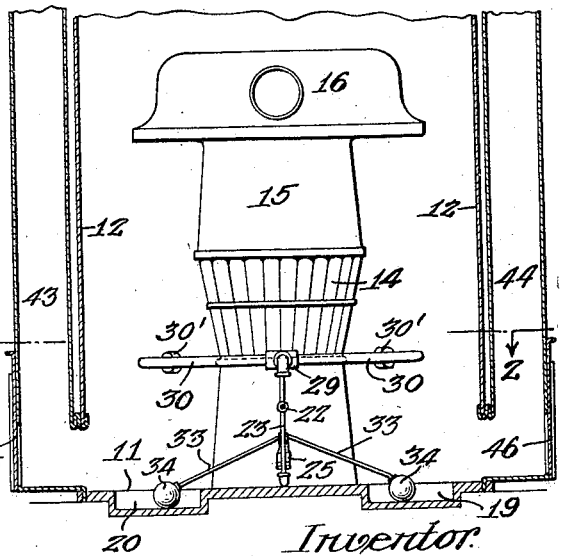
Fig.3.
Fig.10.
Witness:
Walter Chism
Inventor
Charles McVeety
by M. Van Doostink
his Attorney.

C. McVEETY.
HUMIDIFIER FOR FURNACES.
APPLICATION FILED MAR. 28, 1922.
1,438,318.
Patented Dec. 12, 1922.
2 SHEETS—SHEET 2.
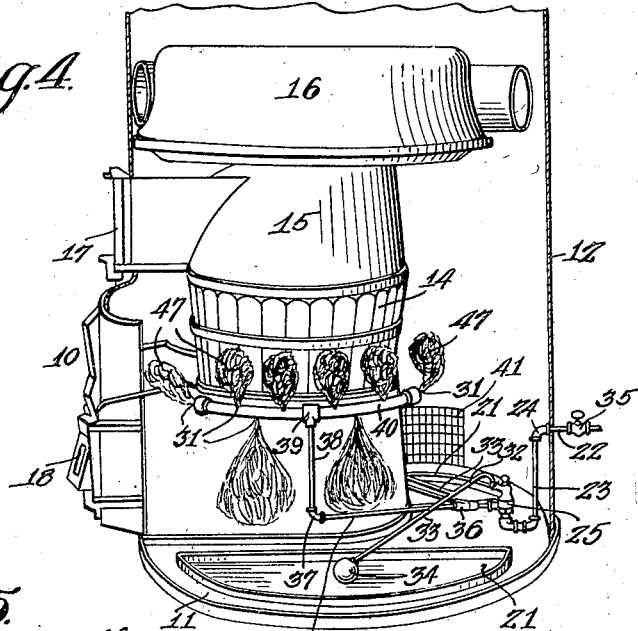
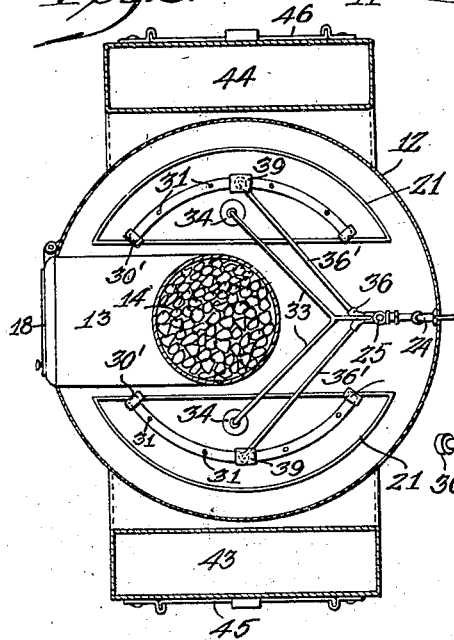
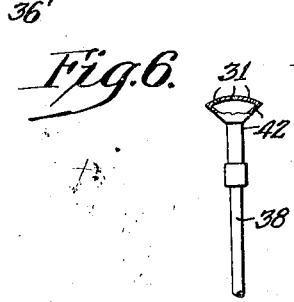
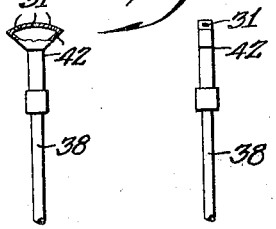
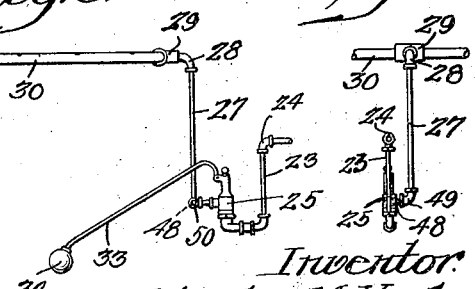
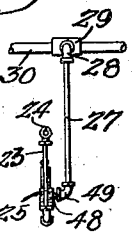
Witness:
Walter Chism
Inventor:
Charles McVeety.
by M. Van Dauskirk
his Attorney.

Patented Dec. 12, 1922.

1,438,318

UNITED STATES PATENT OFFICE.

CHARLES McVEETY, OF CHELTENHAM, PENNSYLVANIA.

HUMIDIFIER FOR FURNACES.

Application filed March 28, 1922. Serial No. 547,482.

*To all whom it may concern:*

Be it known that CHARLES MCVEETY, a citizen of the United States, residing at Cheltenham, in the county of Montgomery and State of Pennsylvania, has invented certain new and useful Improvements in Humidifiers for Furnaces, of which the following is a specification.

This invention relates to humidifiers for furnaces.

The principal object of the invention is to provide a device of the class described whereby the humidity of the air of the rooms being heated by a furnace may be proportioned relative to the humidity of the outside air.

A further object of the invention is to provide a device of the class described whereby the fine particles of dust and ashes that sift through crevices and interstices in the heater structure into the casing of the furnace, and from thence up through the registers into the living rooms, may be moistened and made heavier than the air so that they will be precipitated to the bottom of the furnace, where they may be readily removed, as required.

Humidity in the air has the effect of diminishing in a large measure the presence of this dirt and dust, and this purifies the air of rooms to such an extent that if combined with some efficient scheme of ventilation, it will reduce the evil as well as the carbonic dioxide and other gaseous impurities to a minimum. These results are, of course, to a very large extent, governed by the amount of air introduced into the building and the manner in which it is distributed.

While atmosphere saturated to excess is harmful to the health, properly applied humidified air is quite the opposite. Such an atmosphere will always be healthier than dry, heated air containing dust and gaseous impurities. Gaseous impurities in the air, such as carbonic dioxide, or as it is more commonly known, carbonic acid gas ($CO_2$), which exists in the air, is entirely negative in its properties, i. e., it has no power to sustain animal life. When air is taken in by the lungs, a proportion of the oxygen is used up in making up for deficiencies created by the working of the human system in the purification of the blood, and the carbon given off, which rises to the lungs, chemically combines with another proportion of oxygen to form carbonic acid gas. Now, if this gas is contained in even the smallest proportion above the normal quantity in the atmosphere, it has a tendency to assert its negative qualities, and if contained in large proportions in the air, makes human beings feel uncomfortable and uneasy and detracts from their energy and health.

Air always contains a certain proportion of water vapor, but in extremely variable proportions. The absorbent capacity of water varies with the temperature, and the two factors of humidity and temperature are directly interdependent.

If air is circulated through a large quantity of cold water, it is possible to cool the air of a room by several degrees, a most desirable result in summer, but this method, instead of humidifying the air, dries it.

A still further object of the invention is to provide water receptacles at the base of the heater to receive the condensed vapor and refuse precipitated therein and means to automatically shut off the water supply to said humidifier at a predetermined level of water in said receptacles.

With the above and other objects in view, the invention resides in certain novel features of construction and in unique combinations of parts to be hereinafter fully described and claimed, the descriptive matter being supplemented by the accompanying drawings, wherein:—

Figure 1 is a prespective view of my device;

Figure 2 is a transverse sectional view on line 2—2 of Fig. 3;

Figure 3 is a vertical sectional view on line 3—3 of Fig. 2;

Figure 4 is a perspective view of a modified form of humidifier;

Figure 5 is transverse sectional view of the device shown in Fig. 4;

Figure 6 is a side elevational view of a spray nozzle and its connections;

Figure 7 is an end elevational view of the device shown in Fig. 6;

Figure 8 is a side elevational view illustrating means of shifting the humidifier 30 relative to the fire pot 14;

Figure 9 is a rear elevation of the device shown in Fig. 8; and

Figure 10 is a perspective view of means to provide for a circulation of water through the depressions in the base of the heater.

Like numerals of reference refer to like parts throughout the several figures of the drawings.

Referring to said drawings in detail, the numeral 10 represents a heater of a conventional type adapted for hot air heating provided with a suitable base 11, an outer casing 12, ash pit 13, fire pot 14, combustion chamber 15 and radiator 16 and the usual fire door 17 and ash pit door 18.

Depressions 19 and 20, to serve as water pans or receptacles are provided in the base 11, on which said heater 10 rests, on each side of the ash pit 13. Metal receptacles 21 may be positioned on the base 11 in lieu of said depressions 19 and 20, if desired. When the base of the heater is being constructed of concrete forms may be used to provide these depressions. If the base of the heater has already been prepared it is then preferable to employ the pans 21.

A pipe 22 from a suitable source of water supply enters the heater, 10, through an opening provided in the back of the casing 12, and is connected therein to a vertical pipe 23 by means of an L 24. Said pipe 23 at its base is connected to a standard type of flush valve 25 which has a connection 26 to a vertical supporting supply pipe 27 in the rear of the fire pot 14. Said pipe 27 has an L connection 28 to a union 29 on a U shaped, transversely extending, tubular humidifier or member 30 adapted to extend around the sides of the fire pot 14, in spaced relation thereto, substantially, at the base of said fire pot 14.

The terminals of the U shaped member 30 are closed by caps 30′—30′.

Perforations 31 are provided in both the upper and lower sides of said tubular member 30, and also in the caps 30′, as illustrated.

A rod connection 32, having the branches 33—33 at the terminals whereof are secured ball floats 34—34, is operably connected with the upper portion of the flush valve 25; said floats 34—34 are adapted to rest upon the surface of the water in the depressions 19 and 20, or receptacles 21. A valve 35 is provided on the outer portion of the pipe 22 to regulate the flow of water therethrough.

In lieu of the vertical support pipe 27, connecting the flush valve 25 with the U shaped tubular member 30, a horizontal Y shaped connection 36 carrying the arms 36′—36′, extending on the opposite sides of the ash pit 13, may be connected to said flush valve 25 and at the terminals of said Y branches 36′—36′ be connected by Ls 37—37 to vertical supporting supply pipes 38—38 secured at their upper terminals to unions 39—39 on transversely extending tubular humidifiers or members 40—40 curved to conform to the arc of the sides of the fire pot 14 and in spaced relation thereto, or spray nozzles 42—42, of any well known type, having a sufficient spray radius for the purpose, may be secured to the upper terminals of said vertical supporting pipes 38—38. A type of such spray nozzle 42 is shown in Figs. 6 and 7 of the drawings.

In Figs. 2, 3 and 5 I have shown the heater 10 provided with the return cool air ducts 43—44, paralleling each side of the outer casing 12 and in spaced relation thereto, secured by suitable connections to openings in the said casing 12. This construction is shown and described in detail in Letters Patent issued to me October 11, 1921 and numbered #1,393,301. The return air ducts 43—44, in the present instance, are provided with the vertical slides 45 and 46 so that outside cool air may be admitted to said ducts, if required.

In the absence of the return air ducts 43—44 and the slides 45—46, cool air may be admitted through the casing 12 by one or more air panels 41. (Fig. 4).

To regulate or shift the humidifier 30, closer to or further away from the fire pot 14, the supporting pipe 27 may be pivoted as at 48 (Figs. 8 and 9) by Ls 49 and 50.

In operation:—Water is admitted to the U shaped humidifier or member 30, or the members 40—40, by means of the valve 35 and flush valve 25 and their connections. The amount of water to be admitted through the valve 35 being determined by the degree of heat of the fire in the fire pot 14.

If a body of dry warm air be brought into contact with water, evaporation will begin at once and the vaporization of the water will continue until the air attains proper relative humidity. The rapidity of evaporation will be proportional to the difference between the actual humidity of the air and the possible humidity, and will therefore be proportioned to the air temperature.

As the water evaporates by action of the heat from the fire pot 14, it will pass through the perforations 31 in the form of a spray, indicated by the numeral 47, both upwardly and downwardly and from the caps 30′—30′. This spray will humidify the air as it travels up the heater and through the register or registers to the room or rooms to be heated.

More or less dust and dirt accumulate in the casing 12 which eventually finds its way through the registers into the rooms or else remains in the casing and any disturbance thereof, such as the raking of the fire, agitates this dust which sifts into said casing from crevices or interstices in the ash pit and fire pot and other portions of the heater. The spray 47 will moisten this dust and cause it to be precipitated into the receptacles 19 and 20, or 21, the humidified air being heavier than such dust. The accumulated refuse thus precipitated into the said water receptacles may be removed therefrom at stated periods, admission being gained to said receptacles by the slide doors 45 and 46 in the ducts 43 and 44, or through the casing panel 41.

When saturated air is cooled there is a separation of water in the form of condensation.

When the fire cools to a point where evaporation of the water no longer takes place then the water will fall in the receptacles 19 and 20 or 21 from the perforations 31 and as the water gradually rises in said receptacles, the floats 34—34 will rise in unison therewith until the water attains the upper level of said receptacles, when the connections from said floats to the flush valve 25 will cause said valve to operate, in the well known manner, cutting off the supply of water to the members 30 and 40—40. Said floats may be positioned to actuate said flush valve at a predetermined level of water in said receptacles. If a continuous flow of water is desired, then to prevent an overflow of the receptacles 19 and 20, or 21, a standpipe 51, may be positioned therein extending through an opening in the base thereof and provided with a trap 52 and a connection to an outlet pipe 53, so that said water may pass off after a certain level has been reached in the receptacles. The pipe 51 should not extend to the upper level of said receptacles. A cap 54 may be secured on the upper terminal of said pipe 51 and then the floats 34—34 will operate in the manner hereinbefore described. The receptacles will not overflow even though the pipe 51 should become clogged as the floats 34—34 will operate after the water rises above the level of said pipe 51. This feature of the device is illustrated in Fig. 10 of the drawings.

When this present apparatus is used in connection with my recirculating hot air system employing the cool air return ducts 43 and 44, as described in Letters Patent #1,393,301, hereinbefore cited, the heated air will leave the heater at a temperature of about 140° degrees Fah., and is returned to said heater, through the ducts 43 and 44, at a temperature of, approximately, 50° degrees Fah. This is about the requisite degree of air temperature to cause evaporation of the water by the heat from the fire pot 14. In the event that denser vapor is required to increase the relative humidity, the slides 45 and 46 in the ducts may be adjusted to admit outside cool air of a lower temperature, or outside cool air may be admitted through a panel 41 in the casing 12. This admission of outside cool air will also freshen the air in the heater and thereby aid circulation. Should an increased temperature of the spray water be required, the member 30 may be adjusted closer to the fire pot 14, in the manner hereinbefore described. Per contra, if the member 30 is moved further away from the fire pot 14, a decreased temperature results.

From the foregoing description, taken in connection with the accompanying drawings, the advantage of the construction and operation of the device will be readily understood by those skilled in the art to which the invention pertains, and while I have described the principle of operation, together with the device which I now consider to be the best embodiment thereof, I desire to have it understood that the device shown is merely illustrative and that such changes may be made as are within the scope of the appended claims.

What I claim as new and desire to secure by Letters Patent is:—

1. A hot air furnace, comprising a furnace structure, having a fire box, a shell surrounding the furnace structure in spaced relation and having air inlets and outlets, a perforated water spray pipe surrounding the fire box within the shell to spray water in proximity thereto, means including a valve to supply water to the spray pipe, a water collecting chamber arranged in the shell below the spray pipe to collect condensed steam and unvaporized water, and a float arranged in the chamber and connected with the valve to close it when the level of the water rises in said chamber.

2. A hot air furnace comprising a furnace structure having a fire box, a shell surrounding the furnace structure in spaced relation and having air inlets and outlets, a perforated water spray pipe surrounding the fire box within the shell to spray water in proximity thereto, a water supply pipe connected to said valve, and a supply pipe leading from the valve to the spray pipe and supporting the spray pipe, said last named supply pipe being pivoted whereby the spray pipe may be adjusted toward or away from the fire box, a water collecting chamber arranged in the shell below the spray pipe to collect the condensed steam and unevaporated water, and a float arranged in the chamber and connected with the valve to close it when the level of the water rises in said chamber.

3. A hot air furnace comprising a furnace structure having a fire box, a shell surrounding the furnace structure in spaced relation and having air inlets and outlets, a perforated water spray pipe surrounding the fire box within the shell to spray water in proximity thereto, means including a valve to supply water to the spray pipe, water collecting chambers arranged in the base of the shell upon opposite sides of the furnace structure to collect the condensed steam and unvaporized water, a Y-shaped rod connected with the valve, and floats carried by the ends of the Y-shaped rod and engaging the water in the water collecting chambers to close said valve when the level of the water rises in said chamber.

4. A hot air furnace comprising a furnace structure having a fire box, a shell surrounding the furnace structure in spaced relation and having air inlets and outlets, a perforated water spray pipe surrounding the fire box within the shell to spray water in proximity thereto, means including a valve to supply water to the spray pipe, means to adjust the spray pipe toward or away from the fire box, a water collecting chamber arranged in the shell below the spray pipe to collect the condensed steam and unvaporized water, and a float arranged in the chamber and connected with the valve to close it when the level of the water rises in said chamber.

In testimony whereof I affix my signature.

CHARLES McVEETY.